US011881206B2

(12) United States Patent
Ziv et al.

(10) Patent No.: US 11,881,206 B2
(45) Date of Patent: *Jan. 23, 2024

(54) SYSTEM AND METHOD FOR GENERATING AUDIO FEATURING SPATIAL REPRESENTATIONS OF SOUND SOURCES

(71) Applicant: InSoundz Ltd., Tel Aviv (IL)

(72) Inventors: Ron Ziv, Kfar-Saba (IL); Tomer Goshen, Hod Hasharon (IL); Emil Winebrand, Petah Tikva (IL); Yadin Aharoni, Tel Aviv (IL)

(73) Assignee: INSOUNDZ LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,338

(22) Filed: May 6, 2022

(65) Prior Publication Data

US 2022/0262337 A1 Aug. 18, 2022

Related U.S. Application Data

(63) Continuation of application No. 16/985,734, filed on Aug. 5, 2020, now Pat. No. 11,341,952.

(Continued)

(51) Int. Cl.

| | |
|---|---|
| ***G10L 13/02*** | (2013.01) |
| ***G10L 19/02*** | (2013.01) |
| ***H04S 7/00*** | (2006.01) |
| ***H04R 5/04*** | (2006.01) |
| ***H04R 3/00*** | (2006.01) |

(52) U.S. Cl.

CPC .............. *G10L 13/02* (2013.01); *G10L 19/02* (2013.01); *H04R 3/005* (2013.01); *H04R 5/04* (2013.01); *H04S 7/303* (2013.01)

(58) Field of Classification Search

CPC ..................... G10L 13/02; G10L 19/02; G10L 2021/02166; H04R 3/005; H04R 5/04; H04R 2201/401; H04R 2430/25; H04S 7/303

See application file for complete search history.

(56) References Cited

U.S. PATENT DOCUMENTS 4,076,958 A 2/1978 Fulghum
5,075,880 A 12/1991 Moses et al.

(Continued)

*Primary Examiner* — Yogeshkumar Patel
(74) *Attorney, Agent, or Firm* — M&B IP Analysts, LLC

(57) ABSTRACT

Systems and methods for spatially emulating a sound source. An apparatus includes a microphone array including microphones; and a sound profiler communicatively connected to the microphone array, the sound profiler including a processing circuitry and a memory which contains instructions that, when executed by the processing circuitry, configure the apparatus to: generate synthesized audio based on sound beam metadata, a sound profile, and target listener location data, wherein the sound beam metadata includes timed sound beams defining a directional dependence of a spatial sound wave, wherein the sound profile includes timed sound coefficients determined based on audio signals captured in a space wherein the target listener location data includes a position and an orientation, wherein the synthesized audio emulates sound that would be heard by a listener at the position and orientation of the target listener location data; and providing the synthesized audio for projection.

22 Claims, 7 Drawing Sheets

Related U.S. Application Data

(60) Provisional application No. 62/883,250, filed on Aug. 6, 2019.

(56) References Cited

U.S. PATENT DOCUMENTS

| | | | |
|---|---|---|---|
| 5,226,000 | A | 7/1993 | Moses et al. |
| 5,587,711 | A | 12/1996 | Williams et al. |
| 6,574,339 | B1 | 6/2003 | Kim et al. |
| 7,391,876 | B2 | 6/2008 | Cohen et al. |
| 7,551,741 | B2 | 6/2009 | Zhu |
| 8,494,666 | B2 | 7/2013 | Seo et al. |
| 8,767,968 | B2 | 7/2014 | Flaks et al. |
| 8,824,709 | B2 | 9/2014 | Li |
| 8,826,133 | B2 | 9/2014 | Ng et al. |
| 9,154,879 | B2 | 10/2015 | Yoo et al. |
| 9,510,098 | B2 | 11/2016 | Bai et al. |
| 9,557,400 | B2 | 1/2017 | Wu |
| 9,638,530 | B2 | 5/2017 | Nielsen |
| 9,646,617 | B2 | 5/2017 | Jiang et al. |
| 9,654,644 | B2 | 5/2017 | Spittle et al. |
| 9,674,453 | B1 | 6/2017 | Tangeland et al. |
| 9,681,248 | B2 | 6/2017 | Strub |
| 9,736,577 | B2 | 8/2017 | Yamamoto et al. |
| 9,788,108 | B2 | 10/2017 | Goshen et al. |
| 9,888,333 | B2 | 2/2018 | Zurek et al. |
| 9,918,175 | B2 | 3/2018 | Lee et al. |
| 10,063,987 | B2 | 8/2018 | McGibney |
| 10,129,682 | B2 | 11/2018 | Mentz |
| 10,158,939 | B2 | 12/2018 | Mannion et al. |
| 10,158,962 | B2 | 12/2018 | Dausel |
| 10,176,644 | B2 | 1/2019 | Goossens et al. |
| 10,291,783 | B2 | 5/2019 | Mehta |
| 10,299,063 | B2 | 5/2019 | Chon et al. |
| 10,341,802 | B2 | 7/2019 | Krueger et al. |
| 11,341,952 | B2 * | 5/2022 | Ziv .......................... H04S 7/303 |
| 2014/0355794 | A1 * | 12/2014 | Morrell ................... H04S 7/307 381/303 |
| 2015/0230024 | A1 * | 8/2015 | Goshen .................. H04R 3/005 381/92 |
| 2019/0069115 | A1 | 2/2019 | Krueger et al. |
| 2019/0108688 | A1 | 4/2019 | Goossens et al. |
| 2019/0116451 | A1 | 4/2019 | Noh |
| 2020/0228913 | A1 * | 7/2020 | Herre .................. G10L 21/0272 |

* cited by examiner

400

$\ell = 0$[1]

$$Y_0^0(\theta,\varphi) = \frac{1}{2}\sqrt{\frac{1}{\pi}}$$

$\ell = 1$[1]

$$Y_1^{-1}(\theta,\varphi) = \frac{1}{2}\sqrt{\frac{3}{2\pi}} \bullet e^{-i\varphi} \bullet \sin\theta = \frac{1}{2}\sqrt{\frac{3}{2\pi}} \bullet \frac{(x-iy)}{r}$$

$$Y_1^0(\theta,\varphi) = \frac{1}{2}\sqrt{\frac{3}{\pi}} \bullet \cos\theta = \frac{1}{2}\sqrt{\frac{3}{\pi}} \bullet \frac{z}{r}$$

$$Y_1^1(\theta,\varphi) = -\frac{1}{2}\sqrt{\frac{3}{2\pi}} \bullet e^{i\varphi} \bullet \sin\theta = -\frac{1}{2}\sqrt{\frac{3}{2\pi}} \bullet \frac{(x+iy)}{r}$$

$\ell = 2$[1]

$$Y_2^{-2}(\theta,\varphi) = \frac{1}{4}\sqrt{\frac{15}{2\pi}} \bullet e^{-2i\varphi} \bullet \sin^2\theta = \frac{1}{4}\sqrt{\frac{15}{2\pi}} \bullet \frac{(x-iy)^2}{r^2}$$

$$Y_2^{-1}(\theta,\varphi) = \frac{1}{2}\sqrt{\frac{15}{2\pi}} \bullet e^{-i\varphi} \bullet \sin\theta \bullet \cos\theta = \frac{1}{2}\sqrt{\frac{15}{2\pi}} \bullet \frac{(x-iy)z}{r^2}$$

$$Y_2^0(\theta,\varphi) = \frac{1}{4}\sqrt{\frac{5}{\pi}} \bullet (3\cos^2\theta-1) = \frac{1}{4}\sqrt{\frac{5}{\pi}} \bullet \frac{(2z^2-x^2-y^2)}{r^2}$$

$$Y_2^1(\theta,\varphi) = -\frac{1}{2}\sqrt{\frac{15}{2\pi}} \bullet e^{i\varphi} \bullet \sin\theta \bullet \cos\theta = -\frac{1}{2}\sqrt{\frac{15}{2\pi}} \bullet \frac{(x+iy)z}{r^2}$$

$$Y_2^2(\theta,\varphi) = -\frac{1}{4}\sqrt{\frac{15}{2\pi}} \bullet e^{2i\varphi} \bullet \sin^2\theta = \frac{1}{4}\sqrt{\frac{15}{2\pi}} \bullet \frac{(x+iy)^2}{r^2}$$

FIG. 4 (Prior Art)

SYSTEM AND METHOD FOR GENERATING AUDIO FEATURING SPATIAL REPRESENTATIONS OF SOUND SOURCES

CROSS-REFERENCE TO RELATED APPLICATIONS

This application is a continuation of U.S. patent application Ser. No. 16/985,734 filed on Aug. 5, 2020, which in turn claims the benefit of Provisional Application No. 62/883,250 filed on Aug. 6, 2019, the contents of both of which are hereby incorporated by reference.

TECHNICAL FIELD

The present disclosure relates generally to audio reproduction, and more specifically to emulating audio at an original three-dimensional space.

BACKGROUND

As advances in virtual and augmented reality are made, there is a need in the art for techniques to improve the audio experience to better match the corresponding visual experience. For example, in the arena of video technology, video quality has improved considerably with an ever increasing number of pixels per inch of display, which in turn has increased the resolution and therefore the sharpness of the image. In addition, increases in the depth of color representation have significantly improved the accuracy of video quality to as compared to real life.

Historically, advances in audio quality have progressed at a much faster rate than those of video quality. However, in recent years, the situation has reversed, namely, that recent improvements in video quality appear to be outpacing improvements in audio quality.

By utilizing beamforming techniques, it is possible to reproduce a wavelength of sound in a predetermined direction. Sounds may therefore be selectively recorded using beamforming techniques in combination with arrays of microphones, for example as described in U.S. Pat. No. 9,788,108, which is assigned to the common assignee. Sound captured using such beamforming techniques can be processed and then utilized to project sound in any other location.

Existing solutions for producing more accurate audio content assume that a captured sound source provides the sound into space in an outward-facing direction as compared to the recording device using a sphere-like propagation profile. This assumption is a simplified model compared to the actual way in which sounds are projected. For example, when a human speaks, a listener in the direction the human is pointing will hear the sound in one way, and a listener in another direction will hear differently. Further, the sounds produced by objects moving away from or towards each other may be heard differently due to the doppler effect. This is further complicated when multiple sound sources and multiple listeners are occupying the same space.

To overcome the shortcomings of the existing solutions, some improvements thereto utilize multiple audio capturing devices in the relevant location. These solutions attempt to place as many audio capturing devices as possible within spaces that conceivably might be heard by a listener. This configuration is inefficient, and may make processing audio much more difficult.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include an apparatus for spatially emulating a sound source, comprising: a microphone array including a plurality of microphones; and a sound profiler communicatively connected to the microphone array, the sound profiler further comprising a processing circuitry and a memory, the memory containing instructions that, when executed by the processing circuitry, configure the apparatus to: generate synthesized audio based on sound beam metadata, a sound profile, and target listener location data, wherein the sound beam metadata includes a plurality of timed sound beams defining a directional dependence of a spatial sound wave, wherein the sound profile includes a plurality of timed sound coefficients determined based on audio signals captured in a space wherein the target listener location data includes a position and an orientation, wherein the synthesized audio emulates sound that would be heard by a listener at the position and orientation of the target listener location data; and provide the synthesized audio for projection via at least one audio output device.

Certain embodiments disclosed herein also include a method for spatially emulating a sound source, comprising: transforming a plurality of timed audio samples by applying a Fast Fourier Transform (FFT) to the plurality of timed audio samples, wherein the plurality of timed audio samples includes a plurality of audio signals captured in a space at respective times; determining a plurality of relative transfer functions based on a plurality of spatial base functions; generating a plurality of beamforms based on the transformed plurality of audio samples and the plurality of relative transfer functions; and determining a plurality of timed sound coefficients by applying an inverse FFT to the plurality of beamforms, wherein the plurality of timed sound coefficients produce audio emulating sound that would be heard by a target listener in the space when utilized to generate audio based on a target position and a target orientation of the target listener.

Certain embodiments disclosed herein also include a non-transitory computer readable medium having stored thereon causing a processing circuitry to execute a process, the process comprising: transforming a plurality of timed audio samples by applying a Fast Fourier Transform (FFT) to the plurality of timed audio samples, wherein the plurality of timed audio samples includes a plurality of audio signals captured in a space at respective times; determining a plurality of relative transfer functions based on a plurality of spatial base functions; generating a plurality of beamforms based on the transformed plurality of audio samples and the plurality of relative transfer functions; and determining a plurality of timed sound coefficients by applying an inverse FFT to the plurality of beamforms, wherein the plurality of timed sound coefficients produce audio emulating sound that would be heard by a target listener in the space when utilized to generate audio based on a target position and a target orientation of the target listener.

Certain embodiments disclosed herein also include a system for spatially emulating a sound source. The system comprises: a processing circuitry; and a memory, the memory containing instructions that, when executed by the processing circuitry, configure the system to: transform a plurality of timed audio samples by applying a Fast Fourier Transform (FFT) to the plurality of timed audio samples, wherein the plurality of timed audio samples includes a plurality of audio signals captured in a space at respective times; determine a plurality of relative transfer functions based on a plurality of spatial base functions; generate a plurality of beamforms based on the transformed plurality of audio samples and the plurality of relative transfer functions; and determine a plurality of timed sound coefficients by applying an inverse FFT to the plurality of beamforms, wherein the plurality of timed sound coefficients produce audio emulating sound that would be heard by a target listener in the space when utilized to generate audio based on a target position and a target orientation of the target listener.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 4 is an illustration of spherical harmonic functions utilized in accordance with various disclosed embodiments.

DETAILED DESCRIPTION

Figure 1:
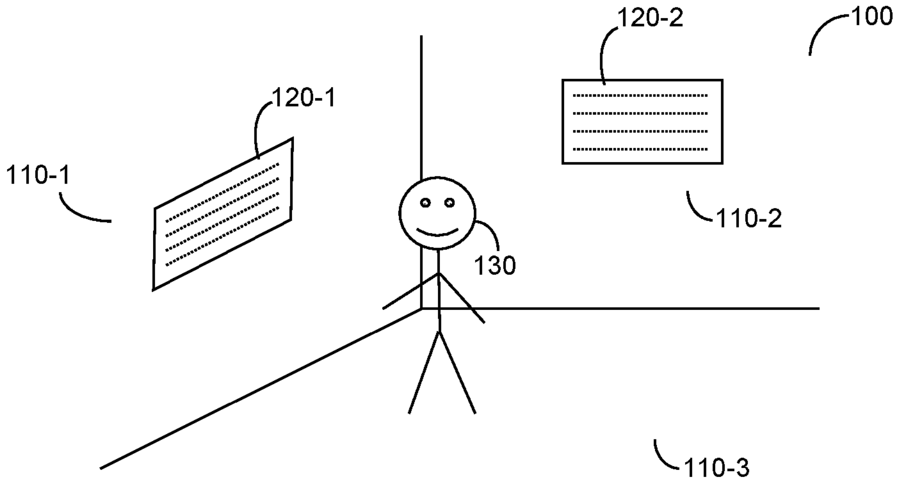
FIG. 1 is an illustration of a space of recording including microphone arrays and a sound source according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In view of the deficiencies of the existing solutions, it has been identified that techniques which can more accurately emulate audio at a given position would be desirable. To this end, the disclosed embodiments provide methods and systems for emulating audio at a given position that utilize location data indicating positions of sound sources and sound capturing devices within a space of recording in order to more accurately reflect the directionality and travel of objects within the space of recording. Audio modified in accordance with the disclosed embodiments can be projected to another space such that a user in the other space experiences the audio from the perspective of a given position within the space of recording.

Sound source profiles are generated for sound sources within a space. The sound space profiles allow for reconstructing sound from the perspective of a listener at a particular position within the space. The reconstructed sound is more accurate to the actual sound that would be heard by the listener at the particular position in the space than sounds produced according to existing solutions which do not account for the position of the listener relative to the sound source and space.

FIG. 1 is an illustration of a space 100 of recording including microphone arrays and a sound source according to an embodiment. The space 100 includes walls 110 and a sound source 130. In the example illustration shown in FIG. 1, the sound source 130 is a human.

The walls 110 include a first wall 110-1, a second wall 110-2, and a floor plane 110-3. The walls 110-1 and 110-2 include respective microphone arrays 120-1 and 120-2. Each microphone array 120 includes multiple microphones (not individually depicted in FIG. 1). A non-limiting example microphone array is described further in U.S. Pat. No. 9,788,108, assigned to the common assignee, the contents of which are hereby incorporated by reference.

The microphone arrays 120 capture sounds produced by the sound source 130. These sounds are utilized in accordance with the disclosed embodiments in order to generate audio emulating the audio that would be heard at different positions within the space 100. To this end, the microphone arrays 120 are communicatively connected to a sound analyzer (e.g., the sound space profile generator 200, FIG. 2).

Figure 2:
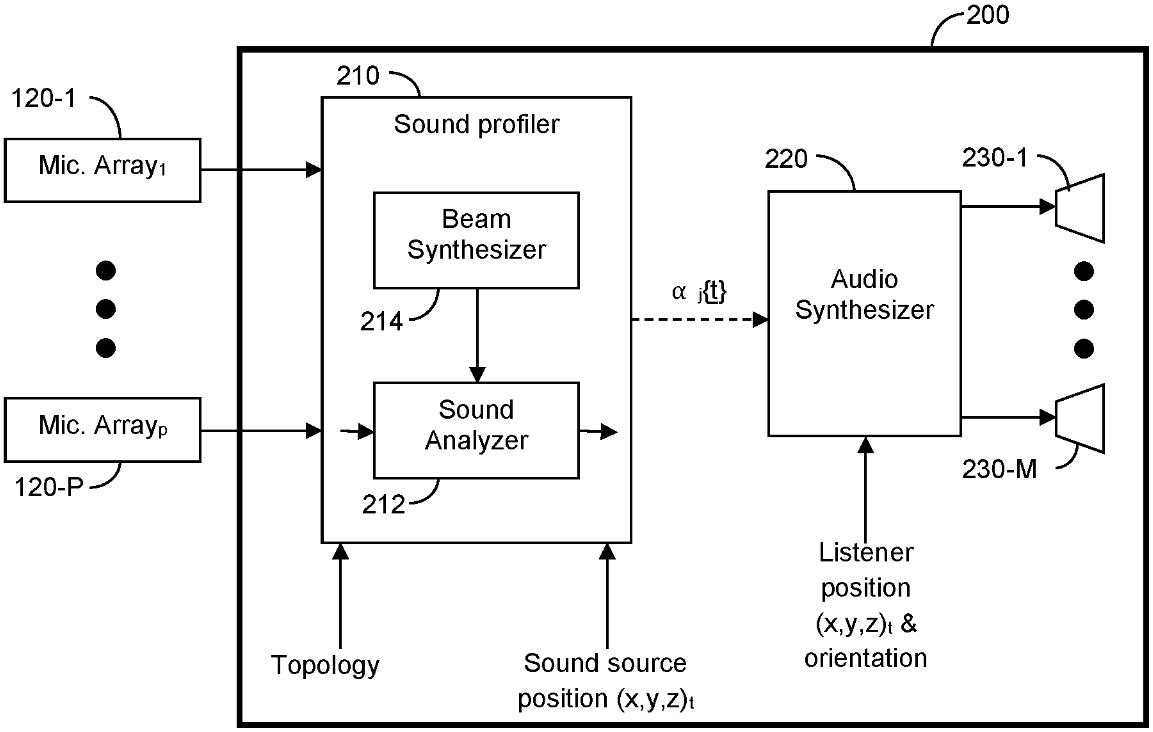
FIG. 2 is a schematic diagram of a sound space profile generator illustrating audio-related components according to an embodiment.

FIG. 2 is a schematic diagram of a sound space profile generator 200 illustrating audio-related components according to an embodiment.

The sound space profile generator 200 includes a sound profiler 210 and an audio synthesizer 220. In some embodiments, the sound space profile generator 200 may further include one or more audio output devices 230-1 through 230-M (hereinafter referred to as an audio output device 230 or as audio output devices 230). In another embodiment (not shown), the sound space profile generator 200 may be communicatively connected to external audio output devices. The audio output devices may be, but are not limited to, speakers, headphones, headsets, or any other devices capable of projecting audio.

The sound profiler 210 is configured to generate sound source profile for sound sources within a space (e.g., the sound source 130 in the space 100, FIG. 1). The sound source profiles enable the reconstruction of sound for a listener that emulates the sound as would be heard in a target position and orientation of the space in a manner that overcomes the deficiencies of the existing solutions.

The sound profiler 210 receives audio data from microphone arrays 120-1 through 120-P (hereinafter referred to as a microphone array 120 or as microphone arrays 120). The audio data includes at least sound signals.

The sound profiler 210 further includes a sound analyzer 212 and a beam synthesizer 214. The beam synthesizer 214 is configured to receive sound beam metadata. The sound beam metadata includes sound beams defining a directional (e.g., angular) dependence of the gain of a spatial sound wave. The beam synthesizer 214 is configured to generate synthesized audio using the manipulated sound beam in accordance with the disclosed embodiments and to provide the synthesized audio to the audio synthesizer 220. An example method that may be performed by the beam synthesizer is described further below with respect to FIG. 6.

The sound beam metadata and the sound signals are transferred to the sound analyzer 212. The sound analyzer 212 is configured to generate a manipulated sound beam based on audio captured by the microphone arrays 120 in accordance with the disclosed embodiments and to provide the manipulated sound beam to the beam synthesizer 214. To this end, the sound analyzer 212 is configured to generate a profile of a sound source (e.g., the sound source 130, FIG. 1). The sound analyzer 212 may be further configured to add filtered sounds to the manipulated sound beam.

In an embodiment, the sound profiler 210 is configured to output a profile of a sound source (e.g., the sound source 130, FIG. 1). In a further embodiment, the profile includes multiple timed sound coefficients $\alpha_j$ calculated as described below. An example method performed by the sound profiler 210 is described further below with respect to FIG. 5.

The sound profiler 210 receives, as an input, sound captured by the microphone arrays 120. The sound profiler 210 further receives sound source location data related to the space in which the microphone arrays 120 are deployed (e.g., the space 100, FIG. 1) and topology data. The sound source location data may include, but is not limited to, three-dimensional (3D) coordinates of the sound source at various times in a format such as $(x_t, y_t, z_t)$, where "t" is a time of recording of the sound and "x," "y," and "z" are respective 3D coordinates of the sound source at each time "t." The sound source location data at various points in time is required in order to allow for reproducing audio accurately even as a sound source moves within a space.

The topology data provides a description of the topology of the space (e.g., the space 100, FIG. 1) in which the sound source is located. Such topology may be static in nature, or may change over time (for example, features which impact the propagation of sound may be added or extracted from the space).

The sound profiler 210 also receives, for each microphone of the microphone arrays 120, a location of the microphone in a format such as $(x_i, y_i, z_i)$, where "i" is an index that is an integer having a value of 0 or greater. For each of the microphones, audio samples $S_i\{t\}$ are collected. A fast Fourier transform (FFT) is performed on each of the audio samples $S_i\{t\}$ to output a respective $S^k$, where "k" represents a frequency-bin. A number "N" of spatial base functions are applied to the output $S^k$ values, where N is an integer greater than "1." In an example implementation, the spatial base functions are harmonic base functions, $f_j(x,y,z)$. For each spatial function "j", processing is performed as follows.

For each frequency-bin "k" (where a frequency-bin may be a given frequency or range of frequencies), the following relative transfer function is calculated:

$$\underline{RTF}^k_j = f^k_j(x_i - x_t, y_i - y_t, z_i - z_t)/f^k_j(x_0 - x_t, y_0 - y_t, z_0 - z_t) \quad \text{Equation 1}$$

Based on the relative transfer functions, beam forming is performed in accordance with the following expression:

$$BF^k_j(\underline{S}^k, \underline{RTF}^k_j) \quad \text{Expression 1}$$

Performing the beam forming may include, but is not limited to, minimum variance distortion-less response (MVDR) beam forming, generalized side-lobe canceler (GSC) beam forming, delay and sum beam forming, and the like. Based on the beam forms generated via the beam forming, timed sound coefficients $\alpha_j\{t\}$ (where each "j" is an integer having a value of 1 or greater and t is the respective time) may be determined by performing an inverse Fast Fourier Transform (IFFT) on the beam forms.

The coefficients $\alpha_j$ (also referred to herein as timed sound coefficients or sound coefficients) are utilized to generate a profile for the sound source which can in turn be utilized to reconstruct audio as described herein.

The profile (including the extracted timed sound coefficients) is transferred to the audio synthesizer 220 for use in generating audio to be projected via, for example, the audio output devices 230. In some implementations, the profile may be transferred via a wired or wireless connection. In some embodiments, the timed sound coefficients of the profile may be first stored in an intermediate memory and then retrieved, in real-time or near real-time, by the audio synthesizer 220 when reproduced audio is required.

The audio synthesizer 220 further receives target listener location data. Such target listener location data may include, but is not limited to, a target position and a target orientation of a simulated listener within the space.

The audio synthesizer 220 is configured to generate sound to be projected based on the profile, audio metadata, and the target listener location data. The sound to be projected is generated for the position orientation with respect to the sound source. As a result, the generated audio accurately emulates the sound that would be heard by a listener at the position and orientation of the simulated listener. An example method performed by the audio synthesizer 220 is described further below with respect to FIG. 6.

The audio data may be received as signals in the frequency domain from microphones of each microphone array. In an embodiment, the sound profiler 210 is configured to perform a Fast Fourier Transform (FFT) for each frequency-bin "k" in accordance with the following equation:

$$S^k = \text{FFT}\{s[n]\} \quad \text{Equation 2}$$

In Equation 2, s[n] are the sound samples provided by a microphone.

Additionally, the sound profiler 210 is configured to determine respective transfer functions $TF_j^k$ for each spatial function "j" (where "j" is an integer greater than or equal to 1) applied for each frequency-bin "k" in accordance with the following equation:

$$TF_j^k = e^{i\omega r} f(r,\theta,\varphi) \quad \text{Equation 3}$$

Figure 3:
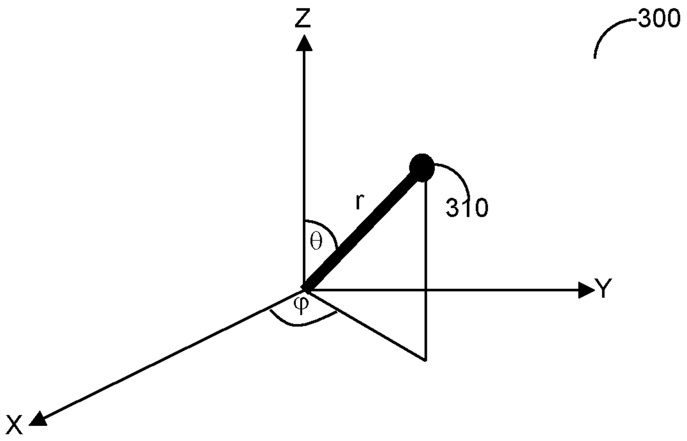
FIG. 3 is an illustration of the parameters of a spatial base function utilized to describe various disclosed embodiments.

In Equation 3, $e^{i\omega r}$ is a delay value and $f(r, \theta, \varphi)$ is a respective spatial base function. The spatial parameters $(r, \theta, \varphi)$ collectively indicate a point in space 310 as depicted in the illustration 300 of FIG. 3. More specifically, r is the length of the vector, θ is the angle from the Z-axis, and φ is the angle from the X-axis. In an example implementation, $f(r, \theta, \varphi)$ is one of the spherical harmonic functions 400 depicted in FIG. 4. It should be noted that the transfer function calculated pursuant to Equation 3 is referred to as an absolute transfer function solely to distinguish from the relative transfer functions determined as described below. In an embodiment, the absolute transfer functions are used to perform beamforming and to calculate relative transfer functions as described further below.

When the absolute transfer functions have been calculated, beamforming is performed. In an example implementation, a Minimum Variance Distortion-less Response (MVDR) weighting vector is determined for each frequency-bin in accordance with the following equation:

$$w_j^k = \frac{R^{-1}TF}{TF^H R^{-1} TF} \quad \text{Equation 4}$$

In Equation 4, "R" is an autocorrelation matrix of an incoming signal, "TF" is a respective absolute transfer function for the frequency-bin, and "$TF^H$" is a Hermitian function of the TF, which is a conjugate transposed matrix.

Based on the MVDR weighting vectors, a scalar multiplication is performed for each frequency-bin "k" per harmonic base "j" in accordance with the following equation:

$$\propto_j^k = [w_j^k]^T \times S^k \quad \text{Equation 5}$$

In Equation 5, "T" is the Transpose operand. The values of "α" are included in a profile and utilized by the audio synthesizer 220 to regenerate audio projected in a space that emulates the audio that would be heard at a given position and orientation within the space.

It should also be noted that, when there are multiple sound sources, the audio for each sound source may be generated by repeating the process performed by the sound space profile generator 200 for each sound source.

Figure 5:
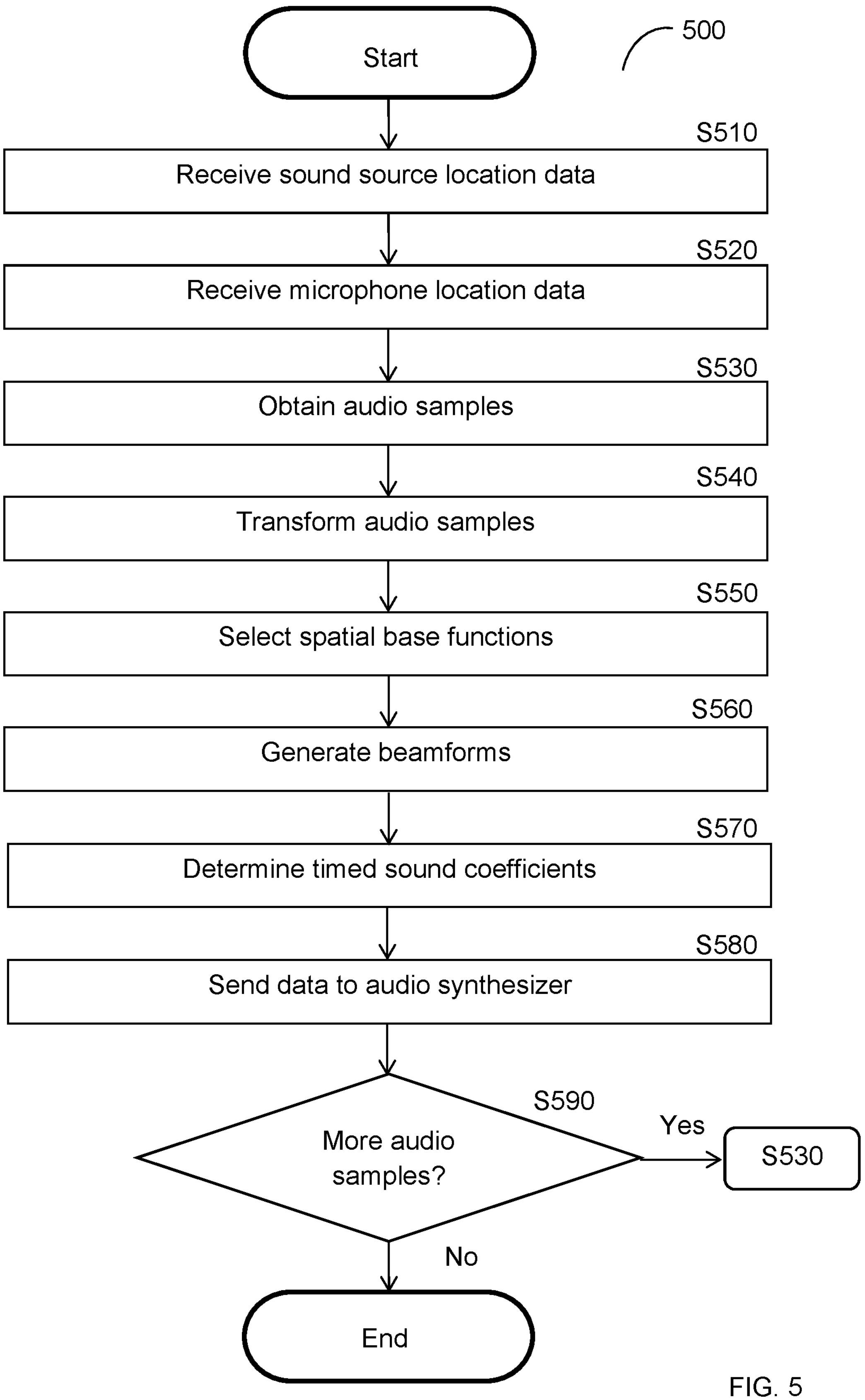
FIG. 5 is a flowchart illustrating a method for audio profiling according to an embodiment.

FIG. 5 is a flowchart 500 illustrating a method for audio profiling according to an embodiment. In an embodiment, the method is performed by the sound space profile generator 200. More specifically, part or all of the method may be performed by the sound profiler 210, FIG. 2.

At S510, sound source location data and topology data are received.

The sound source location data may include, but is not limited to, three-dimensional (3D) coordinates of the sound source at various times in a format such as $(x_t, y_t, z_t)$, where "t" is a time of recording of the sound and "x," "y," and "z" are respective 3D coordinates of the sound source at each time "t."

The topology data provides a description of the topology of the space (e.g., the space 100, FIG. 1) in which the sound source is located. Such topology may be static in nature, or may change over time (for example, features which impact the propagation of sound may be added or extracted from the space). The sound profiler 210 receives, for each microphone of the microphone arrays 120, a location of the microphone in a format such as $(x_i, y_i, z_i)$, where "i" is an index that is an integer having a value of 0 or greater. For each of the microphones, audio samples $S_i\{t\}$ are collected. A fast Fourier transform (FFT) is performed on each of the audio samples $S_i\{t\}$ to output a respective $S^k$, where "k" represents a frequency-bin. A number "N" of spatial base functions are applied to the output $S^k$ values, where N is an integer greater than "1." In an example implementation, the spatial base functions are harmonic base functions, $f_j(x,y,z)$.

At S520, microphone location data is received. In an example implementation, the microphone location data includes, for each microphone of the microphone arrays 120, a location of the microphone in a format such as $(x_i, y_i, z_i)$, where "i" is an index that is an integer having a value of 0 or greater.

At S530, audio samples are received. The audio samples include at least sound signals captured by microphones deployed in a space.

At S540 the audio samples are transformed. In an embodiment, S540 includes performing a Fast Fourier Transform (FFT) as described above with respect to Equation 2.

At S550, spatial base functions are selected. The spatial base functions may be in the form "f(x, y, z)" or "f(r, θ, φ)". In an example implementation, the selected spatial base functions include spherical harmonic functions, for example, as depicted in FIG. 4.

At S560 beamforms are generated based on the transformed audio samples. In an embodiment, S560 includes determining relative transfer functions as described above with respect to Equations 2 through 5, and beamforming is performed in accordance with Expression 1.

At S570, an inverse FFT is performed on the results of the beamforming to determine timed sound coefficients.

At S580, data is sent to an audio synthesizer (e.g., the audio synthesizer 220, FIG. 2). In an embodiment, the data includes sound beam metadata as well as a sound profile. The sound profile includes the timed sound coefficients determined at S570. The sound beam metadata provides information defining a directional dependence of a spatial sound wave, so that the sound profile includes time sound coefficients determined based on audio signals captured in space.

At S590, it is checked if more audio samples are to be analyzed and, if so, execution continues with S530; otherwise, execution terminates.

Figure 6:
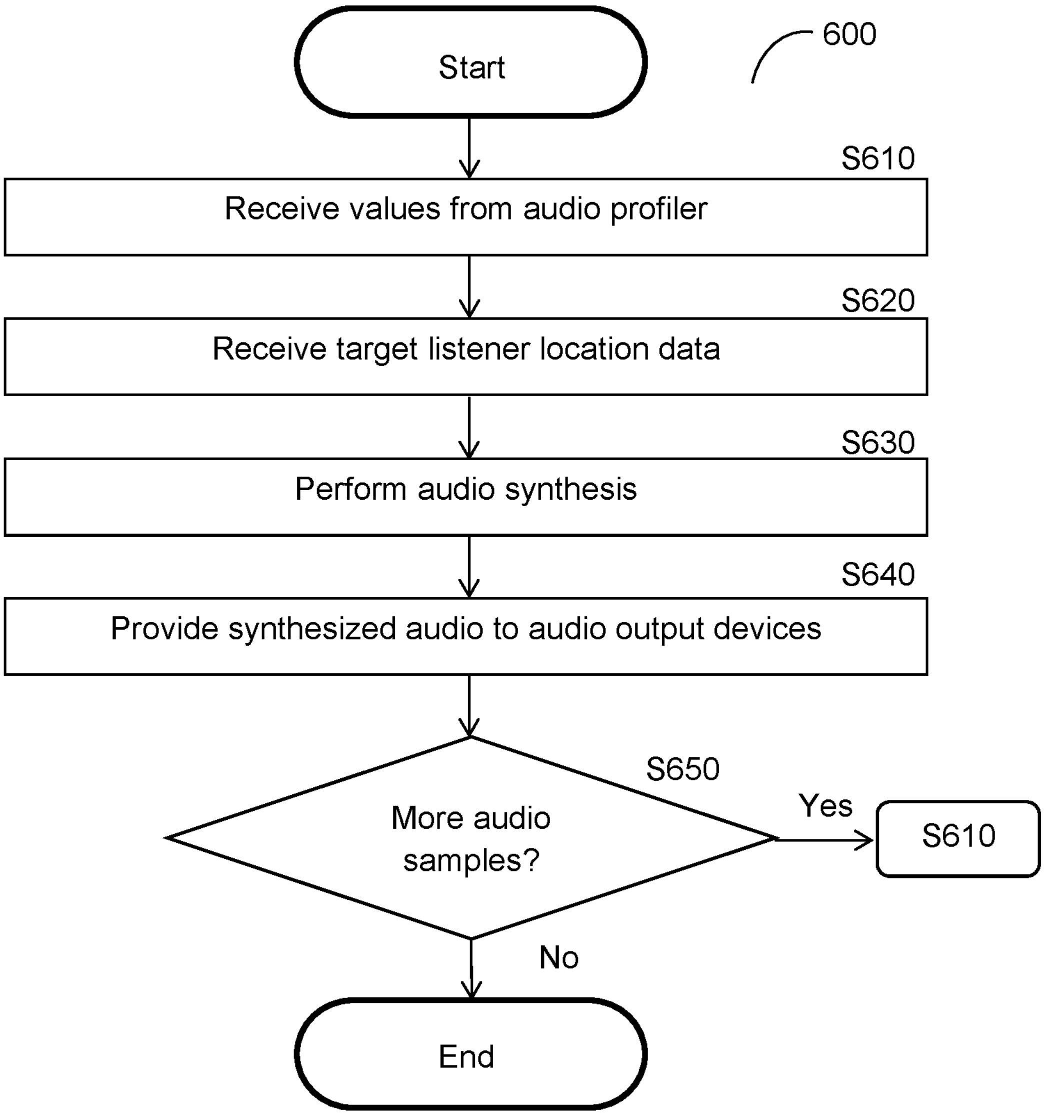
FIG. 6 is a flowchart illustrating a method for audio synthesis according to an embodiment.

FIG. 6 is a flowchart 600 illustrating a method for audio synthesis according to an embodiment. In an embodiment, the method is performed by the sound space profiler 200. More specifically, the method may be performed by the audio synthesizer 220, FIG. 2.

At S610, sound beam metadata and a sound profile are received from an audio profiler (e.g., the audio profiler 210, FIG. 2). The sound beam metadata includes sound beams defining a directional (e.g., angular) dependence of the gain of a spatial sound wave. The sound profile includes timed sound coefficients determined by applying an IFFT to results of beamforming.

At S620, target listener location data is received. The target listener location data may include, but is not limited to, a desired position and orientation of a simulated listener within a space for whom audio is to be reproduced. The audio generated for this desired position and orientation will emulate the audio that would be heard by a listener occupying that position and having that orientation in the space in which the original audio was captured. In an example orientation, the desired position is received in a format such as (x, y, z).

At S630, audio is synthesized based on the sound beam metadata, the sound profile, and the target listener location data. The synthesis includes reconstructing and generating the six degrees of freedom (6DoF) sound for the virtual listener in the presence of multiple speakers in space. The calculation of relative position of the virtual listener per speaker is performed using a spatial reconstruction function combined with Head Related Transfer Function (HRTF).

At S640, the synthesized audio is provided to one or more audio output devices for projection to a user. The synthesized audio may be sent to, for example, speakers, headphones, or a headset.

At S650, it is determined if more audio samples are to be synthesized and, if so, execution continues with S610; otherwise, execution terminates. In an example implementation, additional audio samples may need to be synthesized when multiple audio sources are present in the space.

It should be noted that the methods of FIGS. 5 and 6 are described as being performed by a sound profiler 210 and an audio synthesizer 220, respectively, merely for example purposes, but that the methods are not necessarily performed by different components of a system. As a non-limiting example, a sound space profile generator 200 may include a single component which is configured to perform both the methods of FIGS. 5 and 6.

Figure 7:
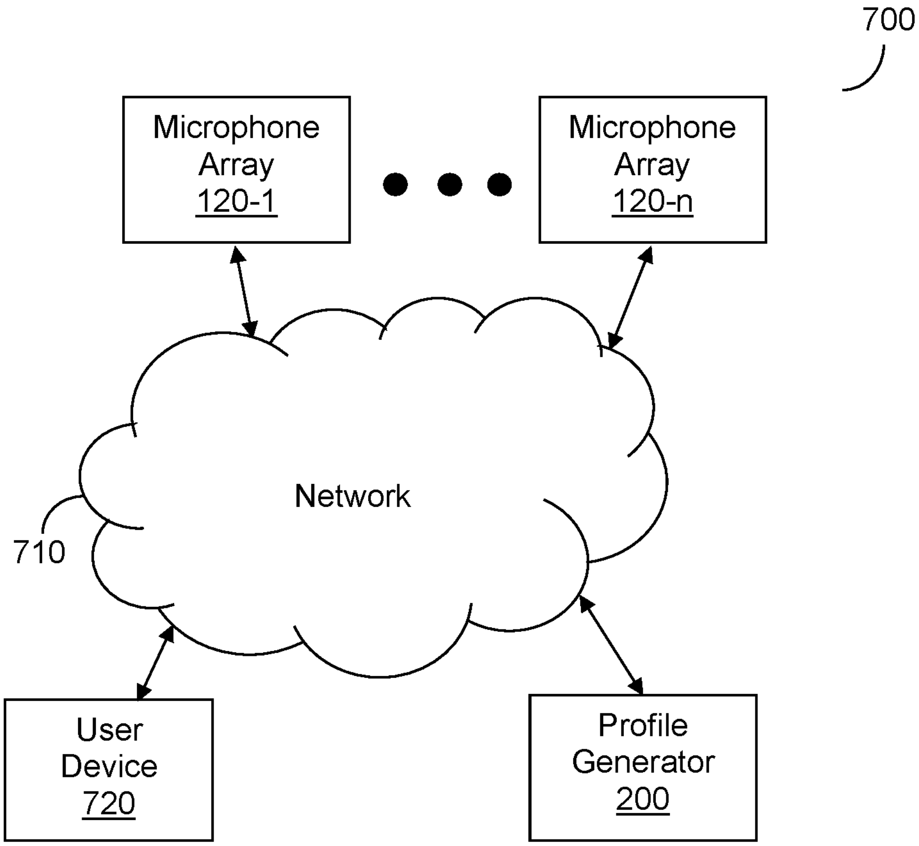
FIG. 7 is a network diagram utilized to describe various disclosed embodiments.

FIG. 7 is a network diagram 700 utilized to describe various disclosed embodiments. In the example network diagram 700, a user device 720, the sound space profile generator 200, and the microphone arrays 120 are communicatively connected via a network 710. The network 710 may be, but is not limited to, a wireless, cellular or wired network, a local area network (LAN), a wide area network (WAN), a metro area network (MAN), the Internet, the worldwide web (WWW), similar networks, and any combination thereof.

The user device (UD) 720 may be, but is not limited to, a personal computer, a laptop, a tablet computer, a smartphone, a wearable computing device (e.g., a virtual reality or augmented reality headset), or any other device capable of receiving and projecting audio.

The profile generator 200 is configured to generate audio featuring spatial representations of sound sources as described herein. More specifically, the profile generator 200 receives audio data from the microphone arrays 120, which are deployed at a space of recording including one or more sound sources. The profile generator 200 is configured to generate audio emulating the sounds projected by the sound sources as they would be heard by a user at a given position within the space of recording.

Figure 8:
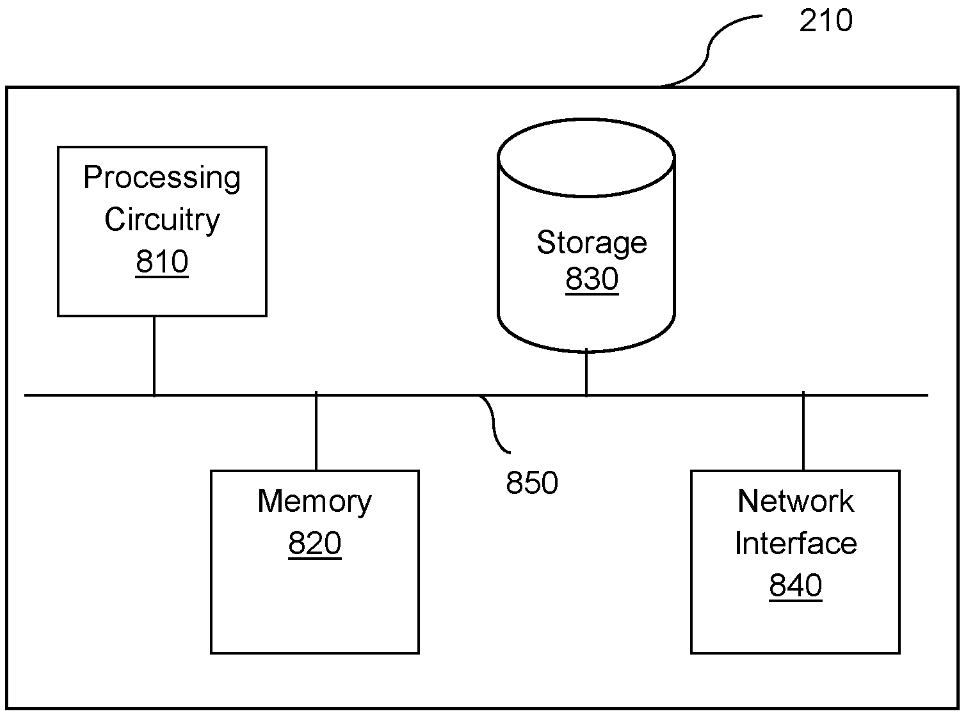
FIG. 8 is a schematic diagram of a sound space profile generator illustrating computing-related components according to an embodiment.

FIG. 8 is a schematic diagram of the sound space profile generator 200 illustrating computing-related components according to an embodiment. The sound space profile generator 200 includes a processing circuitry 810 coupled to a memory 820, a storage 830, and a network interface 840. In an embodiment, the components of the sound space profile generator 200 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows the sound space profile generator 200 to communicate with microphone arrays 120 for the purpose of, for example, receiving audio data, receiving location data, and the like. Further, the network interface 840 allows the sound space profile generator 200 to communicate with the user device 720 for the purpose of sending modified audio data for projection.

It should be understood that the embodiments described herein are not limited to the specific architecture illustrated in FIG. 8, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. An apparatus for spatially emulating a sound source, comprising:
- a microphone array including a plurality of microphones;
- a sound profiler communicatively connected to the microphone array, the sound profiler configured to generate a sound profile and sound beam metadata from audio received from the microphone array, wherein the sound beam metadata includes a plurality of timed sound beams defining a directional dependence of a spatial sound wave, wherein the sound profile includes a plurality of timed sound coefficients determined based on audio signals captured in a space; and
- an audio synthesizer further comprising a processing circuitry and a memory, the memory containing instructions that, when executed by the processing circuitry, configure the apparatus to:
- generate synthesized audio based on sound beam metadata, the sound profile, and target listener location data, wherein the target listener location data includes a position and an orientation, wherein the synthesized audio emulates sound that would be heard by a listener at the position and orientation of the target listener location data; and
- provide the synthesized audio for projection via at least one audio output device.

2. The apparatus of claim 1, wherein the timed sound coefficients are determined based further on location data related to the space, wherein the location data related to the space includes topology data and sound source location data, the sound source location data including a plurality of coordinates of a sound source within the space at respective times.

3. The apparatus of claim 1, wherein the plurality of timed sound coefficients is determined by applying an inverse Fast Fourier Transform to the timed sound beams.

4. The apparatus of claim 3, wherein the timed sound beams are generated by applying a plurality of spatial base functions to timed audio samples captured at the space.

5. The apparatus of claim 4, wherein at least one of the plurality of spatial base functions is a spherical harmonic function.

6. The apparatus of claim 5, wherein the timed sound beams are generated by further determining a relative transfer function per frequency for each of the plurality of spatial base functions.

7. The apparatus of claim 1, wherein the plurality of timed sound beams is generated using any of: minimum variance distortion-less response, generalized side-lobe canceler beam forming, and delay and sum beam forming.

8. A method for spatially emulating a sound source, comprising:
- transforming a plurality of timed audio samples by applying a Fast Fourier Transform (FFT) to the plurality of timed audio samples, wherein the plurality of timed audio samples includes a plurality of audio signals captured in a space at respective times;
- determining a plurality of relative transfer functions based on a plurality of spatial base functions;
- generating a plurality of beamforms based on the transformed plurality of audio samples and the plurality of relative transfer functions; and
- determining a plurality of timed sound coefficients by applying an inverse FFT to the plurality of beamforms, wherein the plurality of timed sound coefficients produce audio emulating sound that would be heard by a target listener in the space when utilized to generate audio based on a target position and a target orientation of the target listener.

9. The method of claim 8, wherein generating the plurality of beamforms further comprises:
- applying a plurality of spatial base functions to the plurality of timed audio samples.

10. The method of claim 9, wherein the plurality of spatial base functions includes at least one spherical harmonic function.

11. The method of claim 8, wherein the plurality of beamforms is generated using any of: minimum variance distortion-less response, generalized side-lobe canceler beam forming, and delay and sum beam forming.

12. The method of claim 8, further comprising:
- transmitting the plurality of timed sound coefficients for use in generating audio.

13. The method of claim 12, wherein transmitting the plurality of timed sound coefficients further comprises:
- storing the plurality of timed sound coefficients in an intermediate storage.

14. The method of claim 12, wherein the plurality of audio signals is captured by at least one microphone array deployed in the space.

15. A non-transitory computer readable medium having stored thereon instructions for causing a processing circuitry to execute a process, the process comprising:
- transforming a plurality of timed audio samples by applying a Fast Fourier Transform (FFT) to the plurality of timed audio samples, wherein the plurality of timed audio samples includes a plurality of audio signals captured in a space at respective times;
- determining a plurality of relative transfer functions based on a plurality of spatial base functions;
- generating a plurality of beamforms based on the transformed plurality of audio samples and the plurality of relative transfer functions; and
- determining a plurality of timed sound coefficients by applying an inverse FFT to the plurality of beamforms, wherein the plurality of timed sound coefficients produce audio emulating sound that would be heard by a target listener in the space when utilized to generate audio based on a target position and a target orientation of the target listener.

16. A system for spatially emulating a sound source, comprising:
- a processing circuitry; and
- a memory, the memory containing instructions that, when executed by the processing circuitry, configure the system to:
- transform a plurality of timed audio samples by applying a Fast Fourier Transform (FFT) to the plurality of timed audio samples, wherein the plurality of timed audio samples includes a plurality of audio signals captured in a space at respective times;
- determine a plurality of relative transfer functions based on a plurality of spatial base functions;
- generate a plurality of beamforms based on the transformed plurality of audio samples and the plurality of relative transfer functions; and determine a plurality of timed sound coefficients by applying an inverse FFT to the plurality of beamforms, wherein the plurality of timed sound coefficients produce audio emulating sound that would be heard by a target listener in the space when utilized to generate audio based on a target position and a target orientation of the target listener.

17. The system of claim 16, the system is further configured to:

apply a plurality of spatial base functions to the plurality of timed audio samples.

18. The system of claim 17, wherein the plurality of spatial base functions includes at least one spherical harmonic function.

19. The system of claim 16, wherein the plurality of beamforms is generated using any of: minimum variance distortion-less response, generalized side- lobe canceler beam forming, and delay and sum beam forming.

20. The system of claim 16, the system is further configured to:

transmit the plurality of timed sound coefficients for use in generating audio.

21. The system of claim 20, the system is further configured to:

store the plurality of timed sound coefficients in an intermediate storage.

22. The system of claim 20, wherein the plurality of audio signals is captured by at least one microphone array deployed in the space.

* * * * *